Patented Mar. 6, 1951

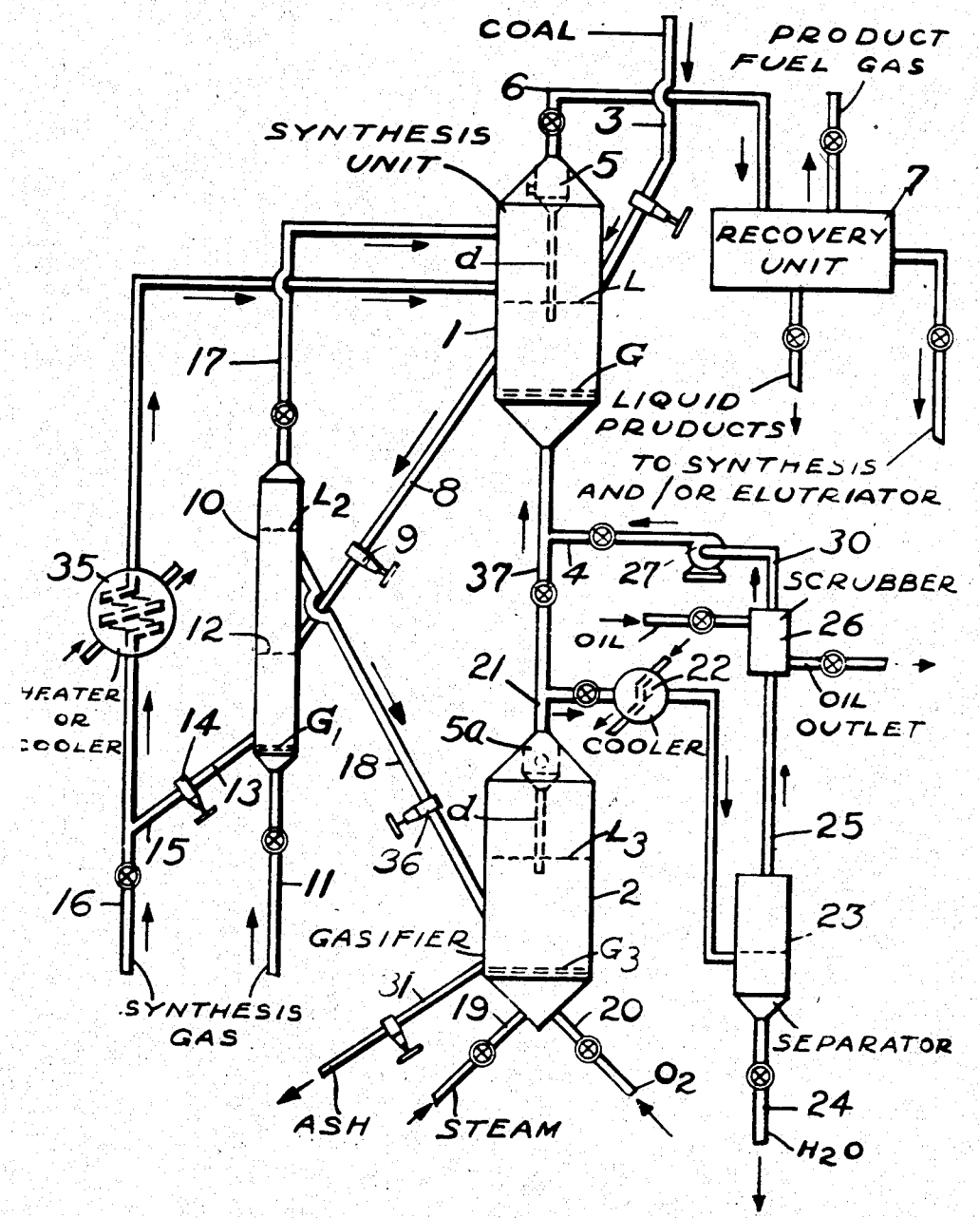

2,543,795

UNITED STATES PATENT OFFICE 2,543,795

PRODUCTION OF LIQUID AND GASEOUS FUELS BY SYNTHESIS FROM COAL

Ivan Mayer and Henry J. Ogorzaly, Summit, N. J., assignors to Standard Oil Development Company, a corporation of Delaware Application October 1, 1949, Serial No. 119,142

7 Claims. (Cl. 48—202)

The present invention relates to improvements in the art of carbonizing, gasifying and treating coal with a gas containing hydrogen and carbon monoxide in such a way as to form a fuel gas of high heating value.

Prior to this invention, it was known to react carbonaceous material such as coal with oxygen and steam at high temperatures to cause the formation of gasiform material suitable for use as a fuel and which contained not only hydrogen and carbon monoxide but also methane, the methane being present in the fuel in greater quantity than that corresponding simply to the methane produced by simple destructive distillation of the coal. In other words, at least a portion of the carbon monoxide and hydrogen reacted in the presence of the coal to form methane. This process has been practiced abroad commercially and is generally referred to as the Lurgi process.

The present invention constitutes an improvement over the old process in several particulars, including the employment of the fluid solids technique, the use of at least two vessels, and the use of a low activity hydrocarbon synthesis catalyst to catalyze the reduction by hydrogen of the oxides of carbon to form methane.

The main object of the present invention, therefore, is to produce a fuel gas of improved heating value in a process which is more economical, flexible and, in particular, which results in the formation of a fuel gas of increased heating value due to the presence of increased quantities of methane.

Another object of the present invention is to provide an increased amount of catalytic activity in a zone of coal carbonization so as to effect substantial synthesis of methane from CO and $H_2$.

Another object of the invention is to provide an improved means for controlling the temperature of a zone in which carbonization of coal and synthesis of methane are simultaneously occurring.

Another object of the present invention is to prevent transfer of synthesis catalyst between coal carbonization and char gasification zones.

Other and further objects of the invention will appear from the following and more detailed description and claims.

In a co-pending application, "Improved Process for Enrichment of Water Gas," filed in the name of Albert B. Welty, Jr., and Sumner B. Sweetser, Serial No. 93,208, filed May 14, 1949, and also in an application entitled "Production of Gas of High Calorific Value," filed in the name of Sumner B. Sweetser, Serial No. 100,846 filed June 23, 1949, there are described two-zone systems for manufacturing city gas of high B.t.u. value which involve the concept of reacting hydrogen and carbon monoxide produced by the water gas reaction under coal carbonization conditions in the presence of a catalyst promoting methane synthesis. The present invention constitutes an improvement over the processes described in the said applications in that according to the present invention, the methane synthesis catalyst is separated from the carbonized coal withdrawn from the carbonization and synthesis vessel, and returned to the said vessel without passing through the gasification zone. The temperature of the recycled catalyst is adjusted to control the temperature level of the carbonization and synthesis zone. With respect to the feature wherein catalyst from the synthesis zone is not charged to the gasifier, the advantage is that it is unnecessary to supply as much heat to the gasifier as would be the case were the catalyst charged to this gasifier, which operates at around 1800° F. According to the present invention, a considerable proportion of catalyst may be employed in the carbonization and synthesis vessel, that is to say, the weight ratio of catalyst to carbonaceous material in the synthesis zone is relatively high and may be as high as one part of catalyst for each part of carbonaceous material, thereby promoting the synthesis of methane to a greater degree.

With respect to the feature of the invention which involves adjusting the temperature of the withdrawn catalyst before recharging it to the synthesis unit, this greatly simplifies the problem of maintaining the desired temperature in the carbonization and synthesis zone. It is superior to the use of a cooling or heating coil disposed in the fluidized mass in the carbonization and synthesis zone, since the tar oils and heavy hydrocarbons produced during the carbonization of the coal tend to polymerize and coke on such immersed heating or cooling surfaces.

In the accompanying drawing there is shown diagrammatically an apparatus layout in which a preferred modification of the invention may be carried into practical effect.

Referring in detail to the drawing, 1 represents a carbonization and synthesis zone and 2 a gasifying zone. Coal (or coke[1]) is charged from some source via line 3 into zone 1. At the start of

---

[1] Certain cokes, particularly those formed at low temperature contain substantial quantities of volatile material and these are usable in the present process.

operations iron catalyst is also charged to this zone. This iron catalyst may be spent catalyst, previously used in the hydrocarbon synthesis reaction, it may be an iron ore, it may be, for instance, pyrites ash, or any other relatively cheap form of iron or iron oxide. Preferably also, the iron should be associated with 1-2% of its weight of an alkaline metal compound having a promotional activity in the hydrocarbon synthesis such as, for example, potassium carbonate.

Both the coal or coke and the iron are subdivided so that they may be readily fluidized. For instance, they may have a particle size of from about 40 to 400 microns. A gas containing hydrogen and carbon monoxide produced by gasifying coke in a manner hereinafter more fully described is charged from line 4 into the bottom of vessel 1, and thereafter this gas is forced through a foraminous member G into the mass of catalyst and coal or coke and caused to flow upwardly therein at a superficial velocity sufficient to form a dense turbulent fluidized bed. The term "superficial velocity" signifies that velocity just above G that would exist were there no solids in the vessel. This superficial velocity may be of the general order or 0.75 ft. per second for best results, although somewhat higher and lower velocities, such as from 0.5 to 3 ft. per second velocities may also be employed. The temperature level may be in the order of 1000° F. Hereinafter in the immediately following description, more details shall be set forth regarding the operating conditions in vessel 1 (and also vessel 2), but for the present the flow of materials through the vessels and auxiliary equipment will be traced without describing the conditions therein unless it shall appear advantageous in the interest of clearness to do so in connection with some particular vessel. Vessel 1 is maintained under coking and hydrocarbon synthesis conditions with the result that a fuel gas is formed which contains hydrocarbons released from the carbonaceous material as well as those generated from hydrogen and carbon monoxide in the presence of the catalyst. Also, of course, in the case where coal is charged to the vessel, phenols, tar acids etc. will be contained in the vaporous effluent which proceeds from the bed, which in its dense fluidized form extends in the view shown from G to L. Above L there is disposed a dilute phase in which the concentration of solids decreases upwardly. The hot effluent gasiform material is forced through separators 5 (1 shown) in order to separate entrained solids from the existing gasiform material and to return the solids through dip pipes $d$ (1 shown) to the dense suspension. The gasiform material substantially freed of entrained solids exits via line 6 from vessel 1 and is delivered to a recovery system 7, generally represented. The purification of such a gas, containing as it does, in addition to carbon monoxide, hydrogen, methane, also organic sulfur compounds, $H_2S$, $CO_2$, small amounts of $NH_3$ as well as the phenols and tar acids and other decomposition products of the coal where that material is charged to the synthesis zone, is well known in the prior art and need not be described in detail herein. It may be pointed out, however, that since the principal product of the present invention is a high B. t. u. fuel gas, the normally gaseous constituents in line 6 should be treated for sulfur removal to reduce its corrosiveness, to improve its odor, and for the removal of carbon dioxide to increase the B. t. u. value per unit volume of the finished gas. Only minor amounts of nitrogen should be present in the finished gas made according to the present invention.

Referring again to the synthesis zone, a mixture of catalyst and carbonized solids or coke is withdrawn continuously or intermittently through line 8, controlled by valve 9 and charged to a dense phase elutriator 10. A gas containing hydrogen and carbon monoxide, for example, a portion of the gas from line 4, is charged into the bottom of 10 from line 11, and forced upwardly through 10 at a low velocity sufficient to maintain the solids in aerated and mobile condition, but not so high as to prevent classification of the solids therein, resulting in an upper coke layer (above region indicated in 12) and below that a layer of catalyst. The superficial velocity in elutriator 10 should be of the order of 0.1 to 0.5 ft. per second. As usual, the elutriator is provided with a grid or screen $G_1$ similar to that shown in vessel 1 and the coke layer will have an upper dense phase level at $L_2$, this being determined, of course, by the amount of solids present in the elutriator. The separated catalyst is withdrawn from elutriator 10 by line 13 and passed through a control valve 14, from which it is discharged through line 15 into a stream of synthesis gas in line 16 (which synthesis gas may also be obtained from line 4) and conveyed in the form of a suspension through heater or cooler 35 into vessel 1. Overhead from elutriator 10 the gasiform material charged through line 11 is withdrawn through line 17 and charged into vessel 1. By suitable arrangement of the relative positions of valve 14 and vessel 1, sufficient pressure differential may be made available at valve 14 to allow the catalyst to be discharged into all or a part of the gas passing through line 4 and thus to be returned to the bottom of the fluidized bed in vessel 1.

The coke forming, as stated, the upper solids phase in elutriator 10 is withdrawn from said elutriator through line 18 and valve 36 and charged to the water gas vessel or gasifier 2. Simultaneously, steam and oxygen are charged from some independent sources (not shown) respectively via lines 19 and 20 to the bottom portion of gasifier 2, and thereafter, the mixture of steam and oxygen passes upwardly through a foraminous member $G_3$ into gasifier 2. Here again, the superficial velocity of the upflowing gasiform material is regulated to be of the same order as that prevailing in vessel 1 so as to form a fluidized mass of coke in gasifier 2, which mass will have an upper dense phase level at $L_0$. Under conditions more fully described hereinafter, the coke undergoes a gasification with the formation of hydrogen and carbon monoxide and this gaseous mixture is withdrawn from the dense phase bed and forced through separating devices $5a$ similar to those dispersed in the upper portion of vessel 1 wherein entrained solids are separated and returned via dip pipes $d_1$ to the dense phase, whereupon, the water gas or gas containing hydrogen and carbon monoxide exits from 2 via line 21. The separating devices $5a$ may also be located externally to vessel 2 after cooler 22. As in the case of vessel 1, the space above $L_0$ in vessel 2 contains a dilute suspension of solids in gasiform material.

It should also be pointed out that in those pipes illustrated diagrammatically in the drawing through which solids are conveyed downwardly from one height to a lower level (e. g. pipe 8) the said pipes are provided preferably with gas taps through which small currents of fluidizing gas should be injected for the purpose of increasing the flowability of the solids flowing therethrough.

Referring again to gasifier 3, the gasiform material containing hydrogen and carbon monoxide is cooled in cooler 22 to a temperature below the condensing point of water and then discharged to a separator 23 from which the water may be withdrawn through line 24. The gasiform material is withdrawn from the separator 23 through line 25 and forced through an oil scrubber 26, to remove the last traces of dust fines and thence through a blower 27, bringing it up to a pressure slightly higher than that prevailing in 1, whereupon, the gas is charged into line 4 and thereafter into vessel 1, as previously explained.

It should also be noted that by a suitable disposition of the relative heights of vessels 1, 10 and 2, the pseudo-hydrostatic head developed in lines 8 and 18 may be caused to be sufficient so that vessel 2 may be operated at a pressure above that of vessel 1. The gases leaving vessel 1 may therefore, pass directly to vessel 1, without the interposition of blower 27 or scrubber 26. In this case it may also be desired to pass the hot gases directly to vessel 1 without cooling or water removal, as by line 37.

The reaction between hydrogen and carbon monoxide to form methane in vessel 1 is highly exothermic. On the other hand, heat is required to bring the raw coal feed to coking temperature level. Added control is required to adjust the temperature in vessel 1 to the desired level and this may be provided by a suitable adjustment of the temperature of the gas entering vessel 1 and the catalyst recirculated to the same vessel.

In order to improve the gasifying operation occurring in 2, it may be advisable to introduce a potassium compound, as potassium carbonate into the gasifier. This can conveniently be done by dissolving potassium carbonate in water and injecting the solution into line 19. Periodically, ash may be withdrawn from gasifier 2 through line 31. Since this ash is withdrawn at a temperature of around 1800° F. its heat content or portion thereof may be recovered in any suitable manner such as by heat exchange with water to form steam for use in the present process. In order to maintain the activity of the catalyst used for the methane synthesis at a satisfactory level, it will be readily understood that periodic additions of catalyst may be made as through line 3 and balanced by corresponding withdrawals, as from line 13 by line 40.

As to operating conditions, the following are set forth for both zones with the understanding, however, that the precise details, as set forth, are merely illustrative and do not impose any limitation on the invention.

|  | Methane Synthesis Zone | Water Gas Generation Zone |
|---|---|---|
| Pressure, p. s. i. g | 0-600 | 0-600. |
| Temperature, °F | 800-1200 | 1500-2000. |
| Catalyst | Fe | $K_2O$ or $K_2CO_3$. |
| Promoter | $K_2O$ or $K_2CO_3$ | None. |
| Amount of Catalyst, Wt. Percent of carbon contained in vessel | 5-100% | 0.005-1.0. |
| Contact Time in seconds | 5-50 | 5-50. |
| Super. Vel. of Gasiform Material, ft./sec | 0.5-5.0 | 0.5-5.00. |
| Particle size of Solids | 40-400 microns | 40-400 microns. |
| Ash in Carbonaceous Material, percent of carbon | 60-90 wt. % | 5-20 wt. %. |

The calorific value of the gas recovered from the methane synthesis zone is of the order of 500–700 B. t. u./CF.

Numerous modifications of the invention not specifically mentioned herein will suggest themselves to those who are familiar with this art without departing from the spirit thereof.

What is claimed is:

1. A continuous process for producing a fuel gas of high heating value which comprises charging a subdivided carbonaceous material and a subdivided catalytic material to an initial zone, procuring said carbonaceous solid and said catalyst in the form of a turbulent well-mixed fluidized mass, contacting the said mass with a gas containing hydrogen and carbon monoxide at carbonization and methane synthesis conditions for a sufficient period of time to cause substantial conversion to methane, withdrawing carbonized carbonaceous solids and catalyst from the methane synthesis zone and charging them to an elutriation zone, causing a gasiform material to flow upwardly in said elutriation zone in contact with said solids at a low velocity regulated to effect the segregation of two layers of aerated solid, the upper of which is a coke layer and the lower of which is a catalyst-containing layer, withdrawing the catalyst-containing layer from said elutriation zone, adjusting the temperature of the withdrawn catalyst, returning the said catalyst to the methane synthesis zone, withdrawing the coke from the elutriation zone, charging it to a gasifying zone, contacting the coke in the form of a fluidized mass in said last-named zone with steam and oxygen under gasification conditions for a sufficient period of time to effect the desired conversion to gasiform product containing a high proportion of $H_2$ and CO, withdrawing the gasiform product from said gasifying zone, and thereafter charging said gas containing hydrogen and carbon monoxide to said carbonization and methane synthesis zone and recovering from said carbonization and methane synthesis zone a fuel gas of improved heating value.

2. The method specified in claim 1 in which the catalyst is an iron-containing material.

3. The method of claim 1 in which product from the gasifying zone is cooled below the condensation temperature of water, the water at least in part, removed from said product and the product then charged to the said initial zone.

4. The method of claim 1 in which a potassium compound is charged to the first zone to promote the gasifying reaction therein occurring.

5. The method of claim 1 in which a promoter is added to the said initial zone to activate the methane synthesis catalyst therein present.

6. A continuous process for producing a fuel gas of high heating value which comprises charging subdivided coal and a subdivided catalytic material to an initial zone, procuring said coal and said catalyst in the form of a turbulent well-mixed fluidized mass, contacting the said mass with a gas containing hydrogen and carbon monoxide at carbonization and methane synthesis conditions for a sufficient period of time to cause substantial conversion to methane, withdrawing coke and catalyst from the methane synthesis zone and charging them to an elutriation zone, causing a gasiform material to flow upwardly in said elutriation zone in contact with said solids at a low velocity regulated to effect the segregation of two layers of aerated solid, the upper of which is a coke layer and the lower of which is a catalyst-containing layer, withdrawing the catalyst-containing layer from said elutriation zone, adjusting the temperature of the withdrawn catalyst, returning the said catalyst to the methane synthesis zone, withdrawing the coke from the elutriation zone, charging it to a gasifying zone, contacting the coke in the form of a fluidized mass in said last-named zone with steam and oxygen under gasification conditions for a sufficient period of time to effect the desired conversion to gasiform product containing a high proportion of $H_2$ and CO, withdrawing the gasiform product from said gasifying zone, and thereafter charging said gas containing hydrogen and carbon monoxide to said carbonization and methane synthesis zone and recovering from said carbonization and methane synthesis zone a fuel gas of improved heating value.

7. A continuous process for producing a fuel gas of high heating value which comprises charging a subdivided carbonaceous material and a subdivided catalytic material to an initial zone, procuring said carbonaceous solid and said catalyst in the form of a turbulent well-mixed fluidized mass, contacting the said mass with a gas containing hydrogen and carbon monoxide at carbonization and methane synthesis conditions for a sufficient period of time to cause substantial conversion to methane, withdrawing carbonized carbonaceous solids and catalyst from the methane synthesis zone and charging them to an elutriation zone causing a gasiform material to flow upwardly in said elutriation zone in contact with said solids at a low velocity regulated to effect the segregation of two layers of aerated solid, the upper of which is a coke layer and the lower of which is a catalyst-containing layer, withdrawing the catalyst-containing layer from said elutriation zone, cooling the withdrawn catalyst, returning the said catalyst to the methane synthesis zone, withdrawing the coke from the elutriation zone, charging it to a gasifying zone, contacting the coke in the form of a fluidized mass in said last-named zone with steam and oxygen under gasification conditions for a sufficient period of time to effect the desired conversion to gasiform product containing a high proportion of $H_2$ and CO, withdrawing the gasiform product from said gasifying zone, and thereafter charging said gas containing hydrogen and carbon monoxide to said carbonization and methane synthesis zone and recovering from said carbonization and methane synthesis zone a fuel gas of improved heating value.

IVAN MAYER.
HENRY J. OGORZALY.

No references cited.